United States Patent [19]

Ohtomo

[11] 4,315,526
[45] Feb. 16, 1982

[54] STEAM VALVE OF TURBINE SYSTEM IN POWER GENERATING PLANT

[75] Inventor: Atushi Ohtomo, Yokohama, Japan

[73] Assignee: Tokyo Shibaura Denki Kabushiki Kaisha, Kanagawa, Japan

[21] Appl. No.: 87,673

[22] Filed: Oct. 24, 1979

[30] Foreign Application Priority Data

Oct. 27, 1978 [JP] Japan ................................ 53-147030

[51] Int. Cl.³ .............................................. F16K 1/32
[52] U.S. Cl. .............................................. 137/630.14
[58] Field of Search ................. 137/630.13, 630.14, 137/630.15

[56] References Cited

FOREIGN PATENT DOCUMENTS 14487 4/1971 Japan ............................. 137/630.14
840960 7/1960 United Kingdom ........... 137/630.14

*Primary Examiner*—Robert G. Nilson
*Attorney, Agent, or Firm*—Stevens, Davis, Miller & Mosher

[57] ABSTRACT

A steam valve provided for a turbine system of a power plant comprises a by-pass valve provided with a plurality of holes through which steam from a boiler enters into the by-pass valve, a main valve connected thereto, and a valve rod. The by-pass valve is provided with an inner chamber the bottom portion of which is enlarged.

1 Claim, 2 Drawing Figures

STEAM VALVE OF TURBINE SYSTEM IN POWER GENERATING PLANT

BACKGROUND OF THE INVENTION

This invention relates to an improvement of a steam valve of a turbine system in a steam electric power generating plant or a nuclear power plant.

Generally, it is required for a turbine of a steam electric power generating plant or a nuclear power plant to reduce thermal stress at the time of starting. For this reason, at the starting of the turbine, a flow quantity of steam generated by a boiler has to be controlled by a by-pass valve disposed within a main steam valve and having a small diameter under a condition in which a steam control valve is fully opened. A valve rod is disposed at a portion below the by-pass valve so as to push it upwardly. With this construction, since steam under a high pressure is regulated by a small lift of the valve rod, the steam flows into the main steam valve at a considerably high speed, and the valve is often subjected to erosion caused by the abrasive action of oxide scale initially contained in the steam. This erosion damages not only the valve itself but also nozzles or vanes of the turbine.

A conventional steam valve of the type described before comprises a main valve, a by-pass valve, a valve rod with its upper end firmly fitted into the lower portion of the by-pass valve, and a valve seat disposed around the by-pass valve. The main valve is disposed below and in contact with the by-pass valve. The by-pass valve is provided at its peripheral wall with a plurality of through holes extending in a direction parallel to the flow direction of the steam.

The valve rod functions to push the by-pass valve away from the valve seat into the position shown in FIG. 1, wherein the through holes 5 are placed in communication with the flow of steam. When the by-pass valve is so positioned, streams of the steam passing through the opposing holes collide with each other at a central portion of a chamber formed in the by-pass valve, thereby decreasing velocity energy of the streams of the steam. The steam then flows into passages provided at the lower portion of the chamber of the by-pass valve and is discharged into a chamber formed in the main valve. Hydrostatic pressure of the steam discharged in the chamber is increased and the steam is then fed towards the turbine through passages.

However, all the streams of the steam passing through the holes formed through the peripheral wall of the by-pass valve do not always collide against the streams of the steam passing through the opposing holes, and thereby causes turbulent flow of the steam in the chamber of the by-pass valve. In addition, the steam from the by-pass valve is throttled twice by two passages, so that it is difficult to feed a large quantity of the steam to the turbine and it is necessary to design the holes so as to have a considerably large cross-sectional area to avoid adverse effects caused by throttling twice the steam. For all of the foregoing reasons, design of an erosion-resistant and an efficient steam valve is difficult.

SUMMARY OF THE INVENTION

Therefore, an object of this invention is to provide an improved steam valve of a turbine system of a power plant capable of controlling a flow quantity of steam from a boiler with less energy loss.

Another object of this invention is to provide a steam valve of a turbine system having an improved by-pass valve.

According to this invention, there is provided a steam valve assembly for use in a steam turbine system of a power plant of the type comprising a by-pass valve connected to a boiler through a plurality of holes formed on the peripheral wall thereof, the by-pass valve being provided with an inner chamber communicated with the holes, a main valve disposed below and connected to the by-pass valve, a valve seat disposed around the by-pass valve, a valve rod having a top end slidably connected into the by-pass valve, and a passage communicating the chamber of the by-pass valve with a turbine, wherein the chamber of the by-pass valve takes the form of a cylindrical space with its bottom portion enlarged and the passage opens at the enlarged bottom portion.

DESCRIPTION OF THE PREFERRED EMBODIMENTS

Figure 1:
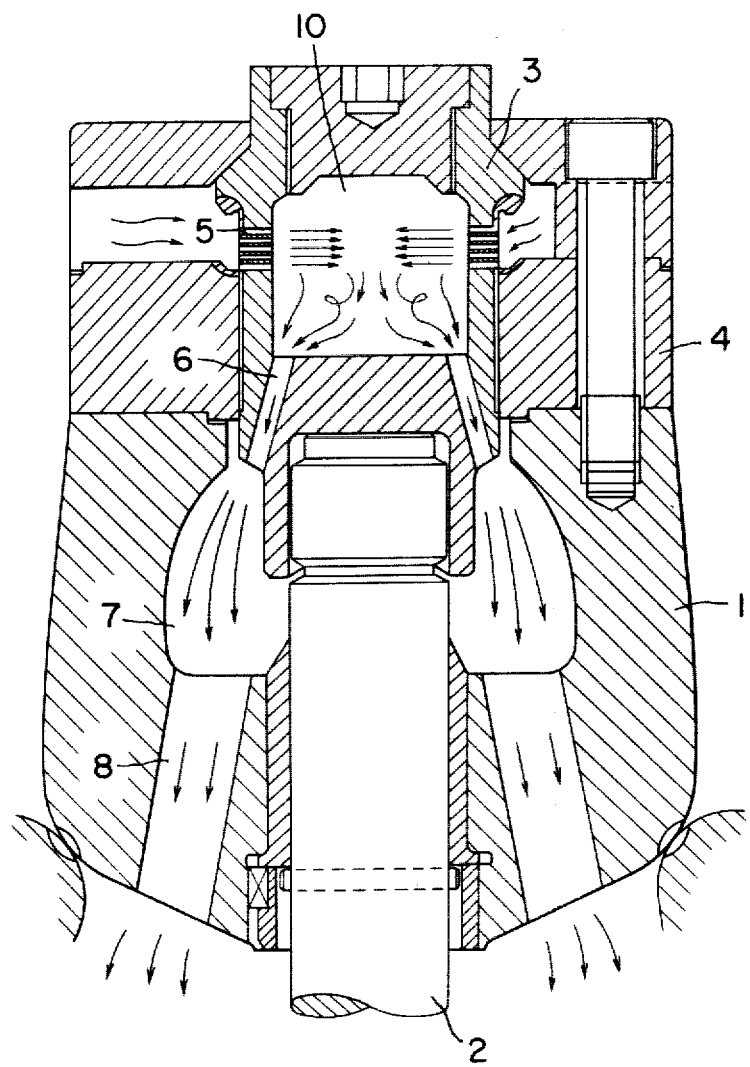
FIG. 1 shows a vertical elevation of a prior art steam valve incorporated into a turbine system of a power plant.

The prior art steam valve shown in FIG. 1 comprises a main valve 1, a by-pass valve 3 slidably connected to the main valve, a valve seat 4 disposed around the by-pass valve, and a valve rod 2 with its upper end fitted into the lower portion of the by-pass valve 3. A plurality of through holes 5 are provided at a portion of the peripheral wall of the by-pass valve 3 extending in a direction parallel to the flow direction of the steam from a boiler, not shown.

The streams of the steam passing through the holes 5 enter into a chamber 10 of the by-pass valve 3 and collide or are mixed with each other thereby decreasing the velocity energy of the streams of the steam. The steam then enters into passages 6 formed at the bottom of the chamber 10 and is thereafter discharged into an annular chamber 7 formed in the main valve 1 through the passages 6. The hydrostatic pressure of the steam discharged in the chamber 7 increases and the steam is then fed towards a turbine, not shown, through passages 8. Thus, the steam is throttled twice by the passages 6 and 8.

Figure 2:
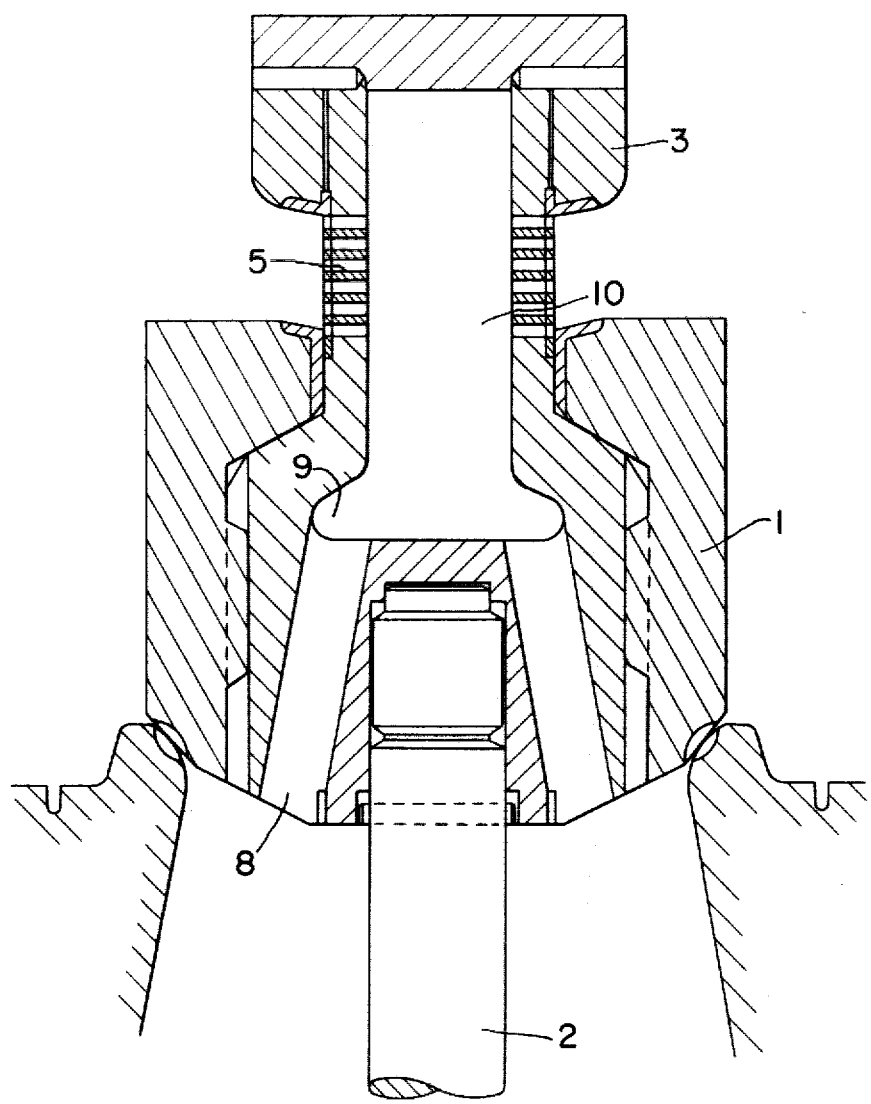
FIG. 2 shows a vertical elevation of a steam valve according to this invention.

FIG. 2 shows a steam valve according to this invention, in which like reference numerals are applied to elements corresponding to those shown in FIG. 1. In FIG. 2, steam fed from a boiler, not shown, enters into a chamber 10 of a by-pass valve 3 through a plurality of through holes 5 formed at a portion of the peripheral wall of the by-pass valve 3 extending in a direction parallel to the flow direction of the steam from the boiler. The streams of the steam entering into the chamber 10 through the holes 5 collide or are mixed with each other thereby causing turbulent flow of the steam in the chamber 10. The lower portion of the chamber 10 is enlarged to temporarily store the steam and increase the hydrostatic pressure thereof. The turbulent flow of the steam after collision is alleviated in this enlarged portion 9. The operation described above is performed when the valve rod 2 is raised by an operating mechanism, not shown.

Passages 8 are provided for the bottom of the enlarged portion 9 and the steam entering into the portion 9 flows through the passages 8 towards a turbine, not shown, disposed downstream the passages 8.

According to the steam valve of this invention, the enlarged bottom portion 9 of the chamber 10 allows the provision of passages 8 which are wider than the corresponding passages 6 of the steam valve of FIG. 1. The increased wideness of passages 8 in turn allows through holes 5 to be widened to a diameter corresponding to the full extent of the vertical displacement of the by-pass valve by the valve rod 2, thereby diminishing the two-fold throttling of steam associated with the prior art valve of FIG. 1.

I claim:

1. In a steam valve assembly for use in a steam turbine system of a power plant of the type comprising a by-pass valve having a peripheral wall connected to a boiler through a plurality of holes formed through said peripheral wall, said by-pass valve being provided with an inner chamber in communication with said holes, a main valve disposed below and slidably connected to said by-pass valve, a valve seat disposed around said by-pass valve, a valve rod having a top end fitted into said by-pass valve, and a passage communicating said chamber of said by-pass valve with a turbine, the improvement in which said chamber of said by-pass valve takes the form of a cylindrical space with its bottom portion enlarged and said passage opens at said enlarged bottom portion.

* * * * *